United States Patent
Morimoto et al.

(10) Patent No.: US 6,540,644 B2
(45) Date of Patent: Apr. 1, 2003

(54) AUTOMATIC STOP/START-UP CONTROL APPARATUS OF AN ENGINE

(75) Inventors: Kazuhiko Morimoto, Hamamatsu (JP); Yoshiaki Omata, Hamamatsu (JP)

(73) Assignee: Suzuki Motor Corporation, Hamamatsu (JP)

( * ) Notice: Subject to any disclaimer, the term of this patent is extended or adjusted under 35 U.S.C. 154(b) by 0 days.

(21) Appl. No.: 09/943,227

(22) Filed: Aug. 30, 2001

(65) Prior Publication Data

US 2002/0028726 A1 Mar. 7, 2002

(30) Foreign Application Priority Data

Sep. 5, 2000 (JP) .......................... 2000-268028

(51) Int. Cl.[7] .............................................. F16H 59/74
(52) U.S. Cl. ........................................ 477/102; 477/185
(58) Field of Search .......................... 477/185, 182, 477/203, 102; 180/65.2, 65.8; 701/22

(56) References Cited

U.S. PATENT DOCUMENTS

| | | | |
|---|---|---|---|
| 4,414,937 A | | 11/1983 | Ueda et al. |
| 4,500,794 A | * | 2/1985 | Hamano et al. ..... 123/146.5 D |
| 4,520,271 A | * | 5/1985 | Goertler et al. .......... 123/179.3 |
| 4,630,577 A | * | 12/1986 | Cornacchia .............. 123/179.3 |
| 5,451,820 A | * | 9/1995 | Gotoh et al. ............. 123/179.4 |
| 6,120,414 A | * | 9/2000 | Endo et al. ................ 477/185 |
| 6,135,920 A | * | 10/2000 | Kamiya et al. ............. 477/185 |
| 6,251,046 B1 | * | 6/2001 | Yoshino et al. ............. 477/187 |
| 6,334,834 B1 | * | 1/2002 | Mizutani et al. ............ 477/203 |
| 6,404,072 B2 | * | 6/2002 | Onoyama et al. ......... 290/40 A |

FOREIGN PATENT DOCUMENTS

| JP | 2000-97066 | 4/2000 |
|---|---|---|
| JP | 2000-104586 | 4/2000 |

* cited by examiner

Primary Examiner—Richard M. Lorence
Assistant Examiner—David D. Le
(74) Attorney, Agent, or Firm—Flynn, Thiel, Boutell & Tanis, P.C.

(57) ABSTRACT

An automatic stop/start-up control system of an engine, recognizes an early drop of a power assist for brakes while the engine is automatically stopped. The control system enables the will of a driving person to be adequately reflected and the driving person does not feel a sense of incongruity when braking. Accordingly, the automatic stop/start-up control apparatus automatically stops the engine when an automatic stop condition is satisfied while the engine is driven, and automatically starts up the engine when an automatic start-up condition is satisfied while start-up of the engine is stopped. The control apparatus includes a power assist detector to detect power assist of an underpressure assist type brake apparatus equipped in the vehicle and a controller to control so as to automatically start up the engine when a decreasing rate per unit time of power assist, which the power assist detector detects while the engine is automatically stopped, exceeds a first setting value.

11 Claims, 4 Drawing Sheets

AUTOMATIC STOP/START-UP CONTROL APPARATUS OF AN ENGINE

FIELD OF THE INVENTION

This invention relates to an automatic stop/start-up apparatus of an engine which can quickly recognize that a power assist of brakes has fallen while the engine is automatically stopped and which can also automatically stop and start up the engine so that the intent of a person driving is adequately reflected and the person driving does not feel a sense of incongruity.

BACKGROUND OF THE INVENTION

Some vehicles are arranged with an automatic stop/start-up control apparatus in order to reduce fuel consumption of an engine mounted on the vehicle. The automatic stop/start-up control apparatus of an engine controls to automatically stop the engine when an automatic stopping condition, that an accelerator pedal is not stepped on, is satisfied during driving of the engine. The automatic stop/start-up control apparatus of an engine controls to automatically start up the engine when an automatic starting-up condition on starting operation is satisfied during driving of the engine.

In addition, some vehicles possess an underpressure assist type brake apparatus as a brake apparatus. The underpressure assist type brake apparatus assists brake power by utilizing intake underpressure of an engine as booster underpressure for a brake booster and increasing brake hydraulic pressure to be generated when a person driving steps on a brake pedal.

In a vehicle possessing this underpressure assist type brake apparatus, when a brake pedal is again stepped on while an engine is automatically stopped by an automatic stop/start-up control apparatus, booster underpressure of a brake booster decreases and intake underpressure goes during an engine stop. Thus there is the problem that an assist power decreases and effectiveness of brakes deteriorates.

Therefore, in general, while an engine is automatically stopped, when booster underpressure becomes equal to or less than a predetermined value, and when a drop of booster underpressure is predicted from the number of times that a brake pedal is stepped on and returned, or from a result of watching pressure and temperature of hydraulic brake fluid, the engine is automatically started up. By this means, a drop in effectiveness of the brakes is prevented.

Incidentally, as an automatic stop/start-up control apparatus of an engine dealing with such problem, there are samples disclosed in published Japanese Application Laid-Open No. 2000-97066 and No. 2000-104586.

The automatic stop/start-up control apparatus for an engine in published Japanese Application Laid-Open No. 2000-97066, controls to hold brake pressure after an engine is stopped, and controls to again start up the engine when a time of holding the brake pressure exceeds a predetermined time.

Another automatic stop/start-up control apparatus for an engine is discussed in published Japanese Application Laid-Open No. 2000-104586. The vehicle has a brake assist means using a vacuum servo system. When booster underpressure of a brake booster deteriorates to less than a predetermined value while an engine is automatically stopped, the control apparatus controls to again start up the engine after cancelled stop control.

However, because the automatic stop/start-up control apparatus for the engine, in published Japanese Application Laid-Open No. 2000-97066, automatically starts up an engine considering the above time as a condition, even if effectiveness of the brakes does not deteriorate, the engine is again started up when the predetermined time passes. Accordingly, there is the inconvenience that fuel consumption of an engine cannot be reduced.

Moreover, because the automatic stop/start-up control apparatus of an engine, in published Japanese Application Laid-Open No. 2000-104586, automatically starts up an engine considering the above booster underpressure as a condition, when the condition that booster underpressure deteriorates to less than a predetermined value was satisfied, a power assist fails or already becomes a lost state. Accordingly, there is a problem caused by a delay in recognition of a drop of power assist of brakes.

In order to obviate or minimize the above inconvenience, the present invention provides an automatic stop/start-up control apparatus for an engine which automatically stops the engine when an automatic stop condition is satisfied while the engine mounted on a vehicle is driven. The control apparatus automatically starts up the engine when an automatic start-up condition is satisfied while start-up of the engine is stopped. The automatic stop/start-up control apparatus includes a power assist detecting means to detect a power assist of an underpressure assist type brake apparatus equipped in the vehicle; and a control means to control so as to automatically start up when a decrease rate per unit time of power assist, which the power assist detecting means detects while the engine is automatically stopped, exceeds a first setting value.

In this invention, the automatic stop/start-up control apparatus controls to automatically start the engine by using the control means when a decreasing rate per unit time of power assist, which the power assist detecting means detects while said engine is automatically stopped, exceeds a first setting value. Accordingly, the automatic stop/start-up control apparatus can recognize early that a power assist has fallen by a decrease of booster underpressure when a brake pedal is again stepped on while the engine is automatically stopped, and at once can automatically start up the engine. By getting brake power, the automatic stop/start-up control apparatus, as compared with a usual state, does not cause a change of operation power and operation feeling for the brakes.

DETAILED DESCRIPTION OF THE INVENTION

Figure 1:
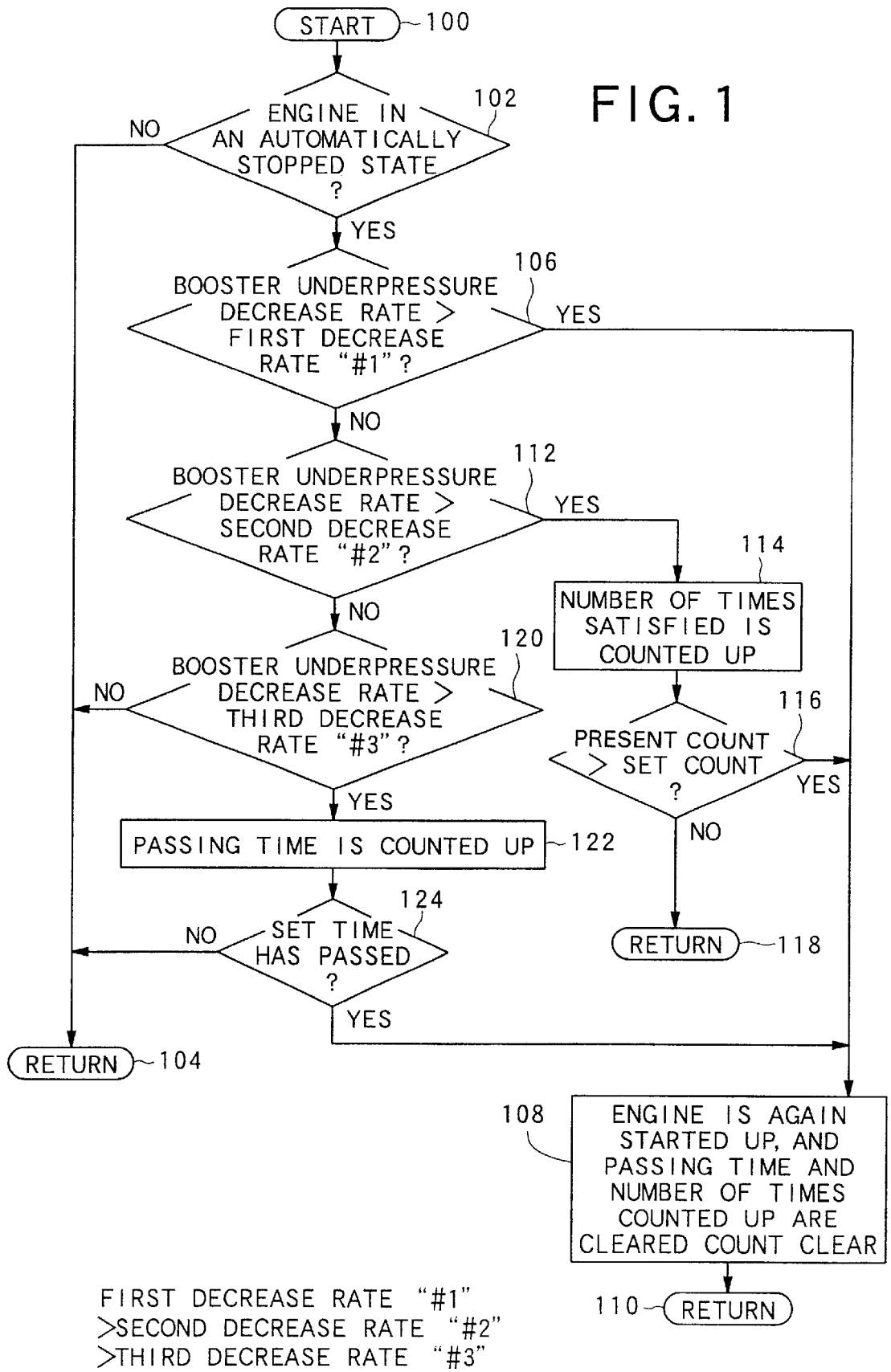
FIG. 1 is a control flowchart of an automatic stop/start-up control apparatus for an engine showing an embodiment of the present invention.

The present invention will now be described in specific detail with reference to FIGS. 1–4 which illustrate an embodiment of this invention. In FIG. 5, an engine 2 is mounted on a hybrid vehicle (not shown) along with a clutch 4 and a manual transmission 6. The transmission 6 is connected with the engine 2 through the clutch 4. The transmission 6 builds in a gearing gear of more than one-grade, for example, a gearing gear of a five-grade system (not shown).

The engine 2 includes an alternator 8 for power-generation, an air-compressor 10 for an air-conditioner, a starter motor 12 for starting up the vehicle. The alternator 8 and the air compressor 10 are connected to the crank shaft by pulleys and belts (not shown). The starter motor 12 is connected to the flywheel by an engageable and disengageable pinion and ring gear (not shown).

Engine 2 mounted on the vehicle is controlled by an automatic stop/start-up control apparatus 14. The engine 2 is controlled in a driving state by the engine control means 16 which constitutes the automatic stop/start-up control apparatus 14, and is automatically controlled to stop and start up by automatic stop/startup control section 18 built in the engine control means 16.

The engine 2 connects to the engine control means 16 through an engine-controlling signal line 20. "Line" is used herein to describe any electrical signal conduit. The engine control means 16 is linked to a battery 24 by an engine control means-dedicated power line 22. The battery 24 is coupled to the alternator 8 through a battery-charging power line 26 and to the starter motor 12 through a battery-driving power line 28. The battery 24 is charged by generated electric power from alternator 8, and supplies driving electric power to starter motor 12. The battery 24 is a conventional 12-volt vehicle battery.

The engine control means 16 has a fuel injection control section, an ignition time control section, and an ISC (idle speed control) section (not shown). The engine control means 16 drives an injector 66 shown in FIG. 3 and an ignition coil/igniter (not shown) mentioned later. The engine control means 16 also controls a quantity of fuel injection and the ignition time of the engine 2 according to an operating state by a signal input from a first crank angle sensor 30 and a water temperature sensor 38 mentioned later.

Figure 3:
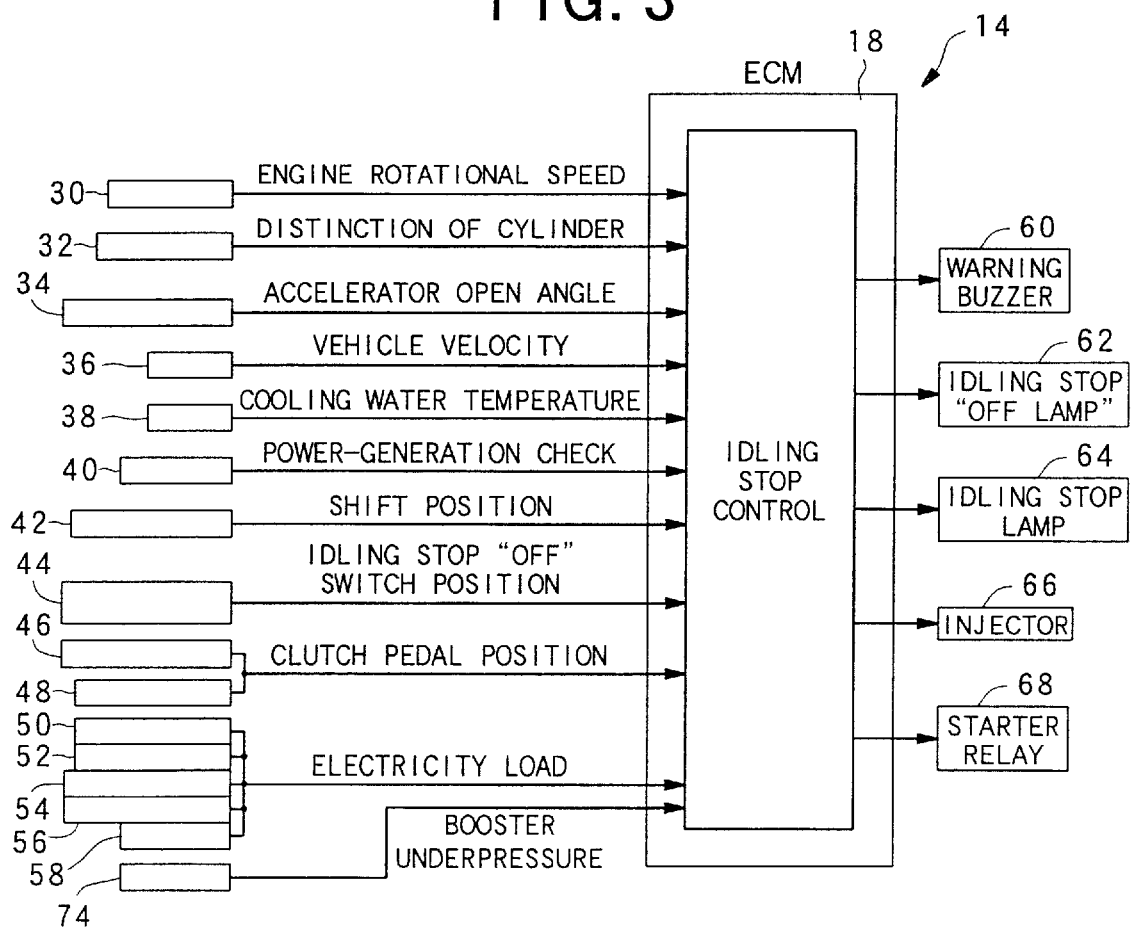
FIG. 3 is a block diagram of an automatic stop/start-up control section.

Automatic stop/start-up section 18 that is built in engine control means 16, as shown in FIG. 3, connects a first crank angle sensor (equivalent to an engine rotational speed sensor) 30 to detect engine rotational speed, a second crank angle sensor 32 for cylinder distinction, an accelerator sensor 34 to detect quantity of stepping on an accelerator pedal as accelerator-open-angle, a vehicle velocity sensor 36 to detect vehicle velocity, a water temperature sensor 38 to detect water temperature of the engine 2, a charge lamp 40 to check a power-generation state of the alternator 8, a neutral switch 42 to detect a shift position of the transmission 6, an idling stop "OFF" switch 44, a first clutch switch (equivalent to clutch upper switch) 46 to detect a state that clutch pedal is inconsiderably stepped, a second clutch switch (equivalent to clutch lower switch) 48 to detect a state that the clutch pedal is about completely stepped on, and a blower fan switch 50, a lighting switch 52, a rear defogger switch 54, a turn signal switch 56 and a windshield wiper switch 58 to detect electricity load, to an input side.

In addition, the automatic stop/start-up section 18 connects to a warning buzzer 60, an idling stop "OFF" lamp 62, an idling stop lamp 64, an injector 66 to inject and supply fuel to the engine 2 and a starter relay 68 to supply electric power to the starter motor 12 of the engine 2 and to drive the output side.

Automatic stop/start-up section 18 judges automatic stop and start-up conditions by a signal input from the first crank angle sensor (equivalent to engine rotational speed sensor) 30, and during driving of the engine 2, stops and/or drives injector 66 and starter relay 68 by approved and/or not-approved automatic stop and start-up conditions, and controls so as to automatically stop and start up the engine.

Figure 4:
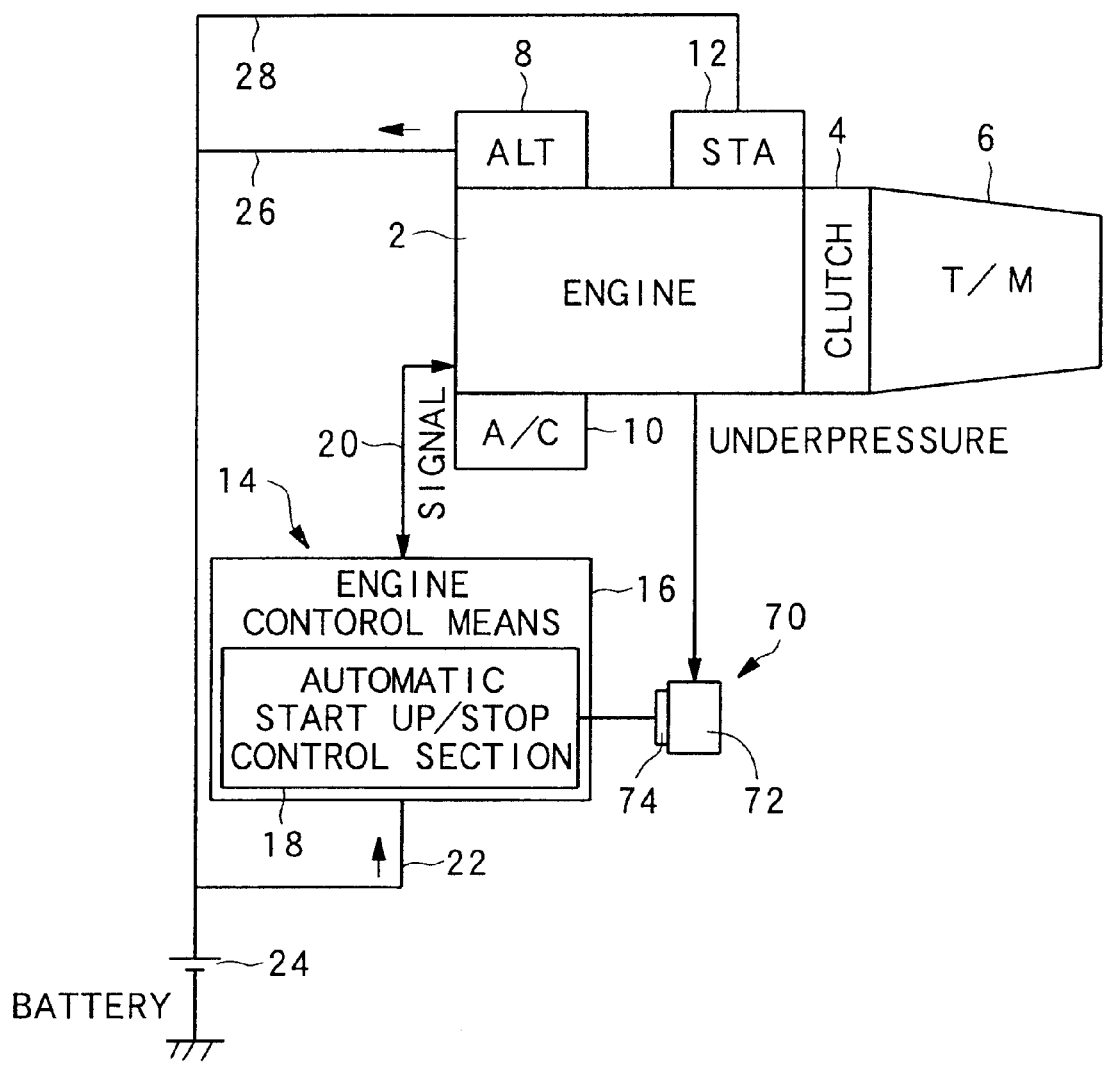
FIG. 4 is a block diagram showing a system of an automatic stop/start-up control apparatus for an engine.
Figure 5:
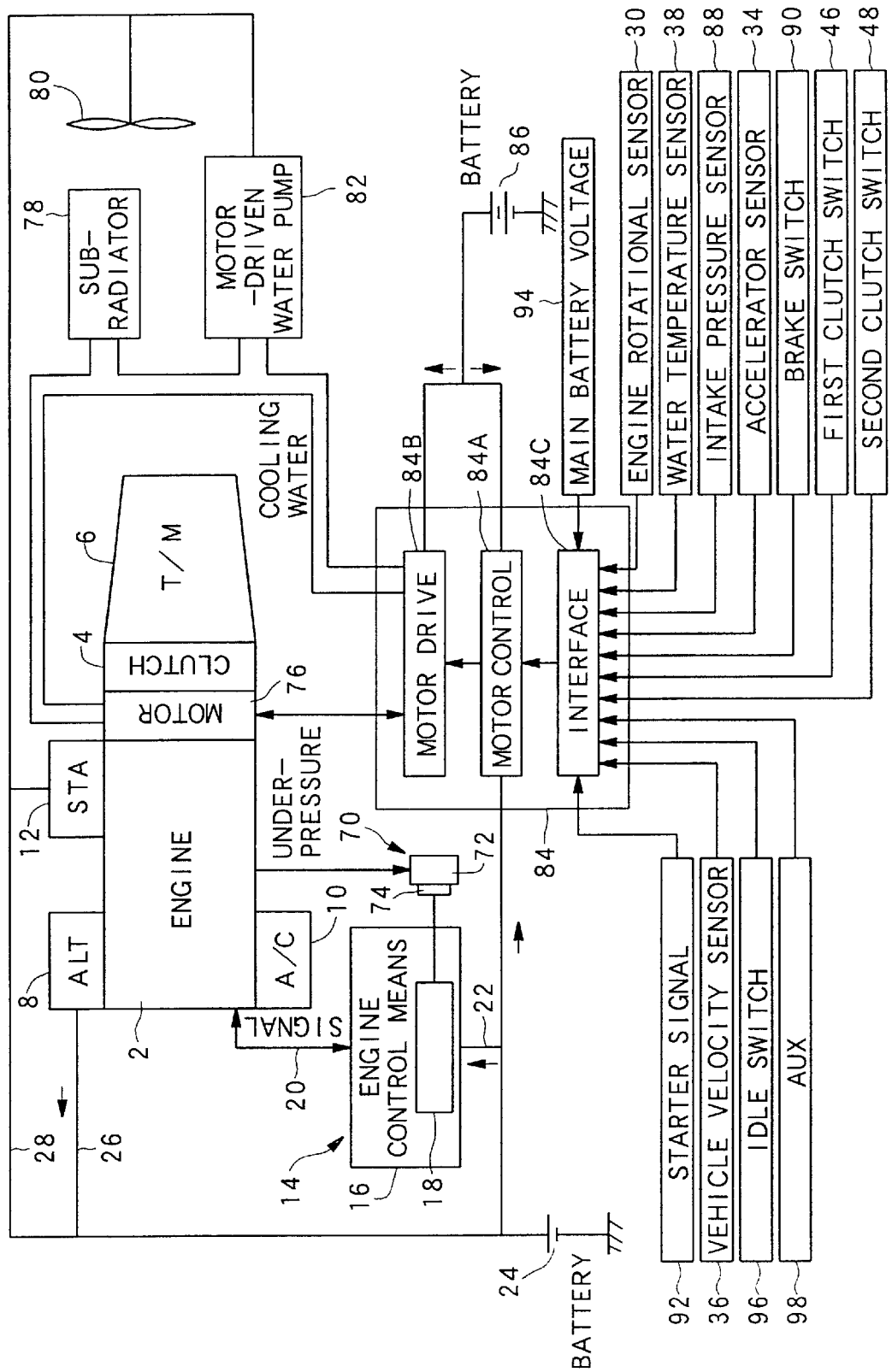
FIG. 5 is a block diagram showing a system of an automatic stop/start-up control apparatus for an engine in a hybrid vehicle.

The vehicle (not shown) possesses an underpressure assist type brake apparatus 70 shown in FIG. 4. The underpressure assist type brake apparatus 70, takes in an intake underpressure of the engine 2 in a brake booster 72 as booster underpressure, thereby increasing brake hydraulic pressure generated by pressing on the brake pedal, and then supplying the brakes (not shown), and consequently assists brake power.

The automatic stop/start-up control apparatus 14 is connected to a booster underpressure sensor 74 which detects booster underpressure in the brake booster 72 of the underpressure assist type brake apparatus 70. As shown in FIG. 3, the booster underpressure sensor 74 connects to an input side of the automatic stop/start-up section 18. The automatic stop/start-up section 18 inputs the booster underpressure that the booster underpressure sensor 74 detects as a power assist for the underpressure assist type brake apparatus 70, and then judges as to whether the engine 2 that has automatically stopped is automatically started up by a decreasing rate per unit time of booster underpressure equivalent to this assist power.

Specifically, automatic stop/start-up control apparatus 14, while engine 2 is automatically stopped, when a brake pedal stepped on is once returned and is again stepped on, controls engine 2 to automatically start up when a decreasing rate per unit time "#" of booster underpressure detected by the booster underpressure sensor 74 is more than a value having a first decrease rate "#1" that is a first set value.

In addition, the automatic stop/start-up control apparatus 14, while the engine 2 is automatically stopped, when the brake pedal is repeatedly stepped on such that the brake pedal is returned and again stepped on, controls the engine 2 to automatically start up when a decrease rate per unit time "#" of booster underpressure detected by booster underpressure sensor 74 is no more than the value of the first decrease rate "#1" and when a number of times "C" counting the condition that the decrease rate per unit time "#" is more than a value of a second decrease rate "#2" that is set below the first decrease rate "#1" over a set number of times Further, automatic stop/start-up control apparatus 14, while the engine 2 is automatically stopped, when a brake pedal is stepped on, becomes gradually loose and is little by little returned, controls the engine 2 to automatically start up when the decrease rate per unit time "#" for the booster underpressure detected by the booster underpressure sensor 74 is no more than the value of the second decrease rate "#2" and a passing time "T" passing after the decrease rate per unit time "#" has been more than the value of a third decrease rate "#3" that is set below the second decrease rate "#2" passes a set time "#T".

Accordingly, relation among the first decrease rate "#1", the second decrease rate "#2" and the third decrease rate "#3" for a decreasing rate of booster underpressure to judge as to whether the engine 2 is automatically started up, is set by an inequality of "#1>#2>#3".

Operation of the embodiment of FIGS. 1–4 is described next.

Referring now to FIG. 1, when the automatic stop/start-up control apparatus 14 of the engine 2 starts control at step 100 by automatic stop/start-up section 18, then a determination is made at step 102 as to whether the engine 2 is automatically stopped because an automatic stop condition is satisfied.

When the determination in step 102 results in "NO", then the routine is returned to step 104. When the determination in step 102 results in "YES", then a determination is made at step 106 as to whether a rate of decrease per unit time "#" of booster underpressure is greater than a value of a first decrease rate "#1".

When the determination in step 106 is "YES", then engine 2 is restarted up at step 108, and the routine is returned to step 110. When the determination in step 106 is "NO", then a determination is made at step 112 as to whether the rate of decrease per unit time "#" of booster underpressure is more than a value of second decrease rate "#2".

When the determination in step 112 is "YES", then the number of times that the determination in step 112 is "YES" is counted at step 114, and a determination is made at step 116 as to whether the current number of times "C" is greater than a set number of times "#C".

When the determination in step 116 is "YES", then the number of times "C" counted is cleared at step 108 after the engine 2 is restarted up, and the routine is returned at step 110. When the determination in step 116 is "NO", then the routine is returned at step 118.

When the determination in step 112 is "NO", then a determination is made at step 120 as to whether a rate of decrease per unit time "#" of booster underpressure is greater than a value for a third decrease rate "#3".

When the determination in step 120 is "NO", then the routine is returned at step 104. When the determination in step 120 is "YES", then the passing time "T" is counted at step 122, and a determination is made at step 124 as to whether the passing time "T" passes a set time "#T".

When determination in step 124 is "NO", then the routine is returned at step 104. When the determination in step 124 is "YES", then the passing time "T" is cleared at step 108 after the engine 2 is restarted up, and the routine is returned at step 110.

Thus, automatic stop/start-up control apparatus 14 for the engine 2, while the engine is automatically stopped, when a brake pedal previously stepped on is stepped on again, controls the engine to automatically start up when the rate of decrease per unit time "#" of the booster underpressure detected by the booster underpressure sensor 74 is more than a value of a first decrease rate "#1".

By this means, the automatic stop/start-up control apparatus 14 can recognize early that a power assist has fallen by a decrease of booster underpressure when a brake pedal is again stopped on while an engine 2 is automatically stopped, and can automatically start up the engine. Accordingly, this system can prevent reduction of brake power and can provide brake power. In addition, as this automatic stop/start-up control apparatus 14 can gain brake power while the engine 2 is automatically stopped, as compared with a usual state, this automatic stop/start-up control apparatus 14 does not cause a change of operation power and operation feeling or touch for the brakes. Accordingly, this system can automatically stop and start up the engine 2 so that the will of a driving person is adequately reflected and the driving person does not feel a sense of incongruity when braking.

In addition, the automatic stop/start-up control apparatus 14, when the brake pedal stepped on is moved inconsiderably while the engine 2 is automatically stopped, controls the engine to automatically start up when a rate of decrease per unit time "#" of booster underpressure detected by the booster underpressure sensor 74 is no more than the value of the first decrease rate "#1" and a number of times "C" counting the condition that the decrease rate per unit time "#" is more than a value of the second decrease rate "#2" that is set below the first decrease rate "#1" is over a set number of times "#C".

By this means, the automatic stop/start-up control apparatus 14, when the decrease rate of power assist is not so large, can also again start up the engine 2 by detecting a reduction of assist power. Accordingly, this system can prevent reduction of brake power and can maintain brake power. By providing brake power, this automatic stop/start-up control apparatus 14 does not cause a change of operation power and operation feeling for the brakes. Accordingly, this system can automatically stop and start up the engine 2 so that a driving person does not feel any sense of incongruity or change in feeling during operation of the brakes.

Figure 2:
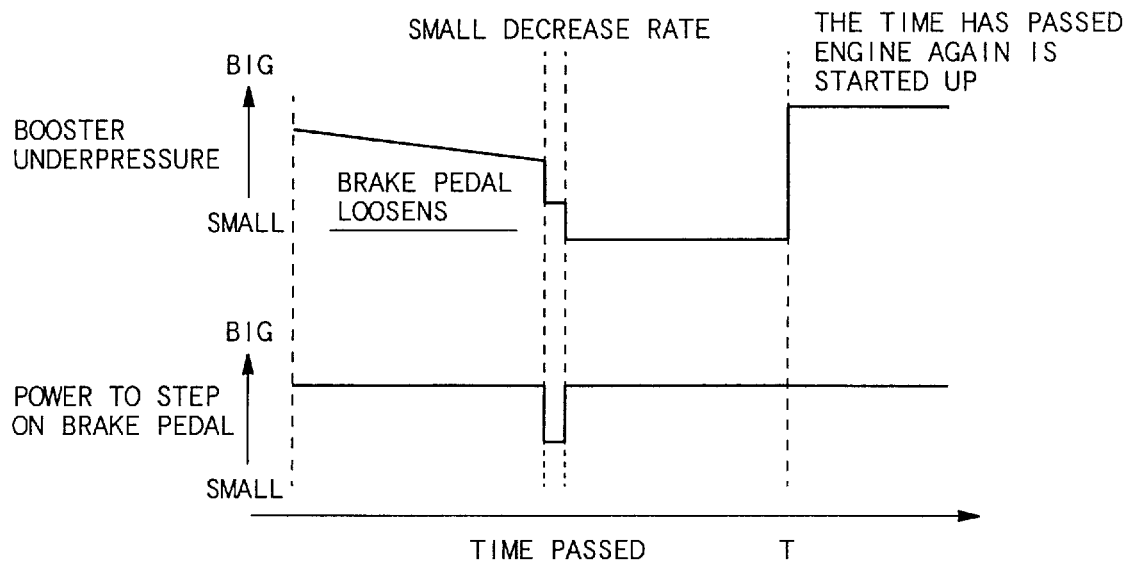
FIG. 2 is a timing chart of an automatic stop/start-up control apparatus.

Further, automatic stop/start-up control apparatus 14, as shown in FIG. 2, when a brake pedal stepped on becomes gradually loose while the engine 2 is automatically stopped, controls the engine 2 to noautomatically start up when a decrease rate per unit time "#" of the booster underpressure detected by the booster underpressure sensor 74 is no more than the value of the second decrease rate "#2" and a passing time "T" passes after the decrease rate per unit time "#" has been at more than a value of a third decrease rate "#3", which is set below the second decrease rate "#2", for more than a set time "#T".

By this means, this automatic stop/start-up control apparatus 14, when the decrease rate of assist power is small, can surely detect reduction of assist power by considering a total decrease rate of assist power that will occur when passing time "T" becomes long, and can maintain stable brake power. By gaining this brake power, the automatic stop/start-up control apparatus 14 does not cause a change of operation power or operation feeling for the brakes. Accordingly, this system can also provide automatic stop and start up of the engine 2 so that a driving person does not feel a sense of incongruity.

Furthermore, this invention is not limited to the above-mentioned embodiments, but is suitable to many possible innovations and applications. For example, in the above embodiment, a vehicle mounted with the engine 2 as a power source is exemplified. However, as shown in FIG. 5, the present invention can also be executed on a so-called hybrid vehicle mounted with an engine 2 and an electric motor 76 as another power source.

Specifically, the engine 2 mounted on a hybrid vehicle (not shown) directly connects to the electric motor 76 (described hereafter as "motor") having both driving and power-generating functions. A sub-radiator 78 and sub-radiator fan 80 for cooling and a motor-driven water pump 82 are arranged with the engine 2. A motor control means 84 to control both driving and power-generating states of the motor 76 is provided to connect with the battery 24 for the engine 2 and a main battery 86 that is for the motor 76.

Motor control means 84, has a motor control section 84A, a motor drive section 84B, interface section 84C, and includes a first crank angle sensor 30 that is an engine rotational speed sensor, an accelerator sensor 34, a vehicle velocity sensor 36, a water temperature sensor 38, a first clutch switch 46, a second clutch switch 48, an intake pressure sensor 88, a brake switch 90, a starter switch 92, a main battery voltage detecting device 94, an idle switch 96 and an auxiliary input (AUX) 98. The motor control means 84 controls both driving and power-generating states of the motor 76 by signals input from the first crank angle sensor 30 and the other sensors or switches.

The engine 2 is mounted on the hybrid vehicle in the same manner as the embodiment of FIG. 4. The engine 2 is controlled in a driving state by the engine control means 16 of the automatic stop/start-up control apparatus 14, which automatically stops and starts up the engine with the automatic stop/start-up section 18 built in the engine control means 16. In addition, by detecting a decreasing rate per unit time of booster underpressure with the booster underpressure sensor 74 arranged in the brake booster 72 of underpressure assist type brake apparatus 70, as shown in FIGS. 1 and 2, the automatic stop/start-up control apparatus 14 judges whether the engine 2 automatically stopped is to be automatically started up.

By this means, the engine 2 mounted on a hybrid vehicle operates in the same manner as in the embodiment of FIG. 4. The automatic stop/start-up control apparatus can automatically start up the engine 2 when recognizing early that assist power has fallen or decreased while the engine 2 is automatically stopped, and thus gain brake power. By providing brake power, the automatic stop/start-up control apparatus does not cause a change of operation power and operation touch or feeling for the brakes. Accordingly, this system can automatically stop and start up the engine 2 so that the desire of a driving person is adequately reflected and the driving person does not feel a sense of incongruity when braking the vehicle.

Incidentally, the above-mentioned embodiment judges whether the engine 2 automatically stopped is automatically started up by a decrease rate per unit time of booster underpressure, or by learning a change of decrease rate depending on a change (habit) of a brake pedal pressing-on state to be different for every driving person. This system does not cause a change of operation power and operation feeling for the brakes, because different rates of decrease for different driving persons are considered. In addition, this system surely acts to automatically start up the engine 2, and gain brake power when assist power has fallen or decreased.

Further, when an engine is automatically stopped frequently and a time interval of an automatic stopping state is short, such as traveling during a traffic jam, this system does not cause a fall of assist power by a decrease of booster underpressure. Accordingly, this system can simplify the automatic stop/start-up control by prohibiting automatic start control of the engine 2 by a reduction of assist power in an automatic stopping state of the engine.

Furthermore, the above-mentioned embodiment directly senses intake underpressure in the brake booster 72 of the underpressure assist type brake apparatus 70 as booster underpressure during driving of the engine 2 and utilizes thereof. By establishing an underpressure tank to save intake underpressure during driving of the engine 2, this system can provide brake power by taking intake underpressure of the underpressure tank in the brake booster 72 as booster underpressure when the booster underpressure has dropped during an automatic stopping state of the engine 2.

Thus, an automatic stop/start-up control apparatus of this invention can control to automatically start up the engine by sensing a decrease rate per unit time of assist power of brakes during an automatic stopping state of an engine. Accordingly, this invention can recognize early that assist power has fallen by a decrease of booster underpressure when a brake pedal is again stepped on while the engine 2 is automatically stopped, and can automatically start up the engine 2. By providing brake power, this invention, as compared with the usual state, does not cause a change of operation power and operation feeling of the brakes.

Consequently, this automatic stop/start-up apparatus can provide brake power for an underpressure assist type brake apparatus during an automatic stopping state of the engine. By getting the brake power, the apparatus can also automatically stop and start up the engine 2 so that the braking expected by a driving person is adequately reflected and the driving person does not feel a sense of incongruity.

What is claimed is:

1. An automatic stop/start-up control apparatus for a vehicle including an internal combustion engine which automatically stops the engine when an automatic stop condition is satisfied while the engine is driven, and which automatically starts the engine when an automatic start-up condition is satisfied while the engine is stopped, comprising: a power assist detector for detecting a power assist of an underpressure assist type brake apparatus equipped in the vehicle; and a controller for controlling so as to automatically start the engine when a decrease rate per unit time of power assist, which said power assist detector detects while said engine is automatically stopped, exceeds a first set value, wherein said controller,.while the engine is automatically stopped, controls the engine to automatically start when a decrease rate per unit time of power assist, which said power assist detector detects, is a value less than said first set value, but more than a second set value that is set below the first set value, when counted more than a set number of times.

2. The automatic stop/start-up control apparatus of an engine as defined in claim 1, wherein said power assist detector comprises a booster underpressure sensor for detecting booster underpressure of a brake booster of an underpressure assist type brake apparatus as the power assit.

3. The automatic stop/start-up control apparatus of an engine as defined in claim 1, wherein said controller, while the engine is automatically stopped, controls the engine to automatically start when a decrease rate per unit time of power assist, which said power assist detector detects, is a value less than said second set value, but more than a third set value that is set below the second set value, is counted a set number of passing times, the set number of passing times being greater than the set number of times.

4. The automatic stop/start-up control apparatus of an engine as defined in claim 3, wherein said power assist detector comprises a booster underpressure sensor detecting booster underpressure of a brake booster of an underpressure assist type brake apparatus as the power assist.

5. A vehicle comprising:
an internal combustion engine having an output shaft;
a negative pressure assist type brake apparatus;
a power assist detector for detecting a change in pressure from a decreasing pressure of the negative pressure assist type brake apparatus;
an automatic engine stop/start-up control apparatus for automatically stopping said engine when an automatic stop condition is satisfied while said engine is driven and for automatically starting said engine when an automatic start-up condition is satisfied while said engine is automatically stopped, said automatic engine stop/start-up control apparatus including a controller for automatically starting the engine when a value of the change in pressure detected by said power assist detector exceeds a first set value while said engine is automatically stopped.

6. The vehicle of claim 5, wherein said vehicle comprises a hybrid vehicle.

7. The vehicle of claim 5, wherein said controller, when said engine is automatically stopped, controls said engine to automatically start when a value of the change in pressure is less than the first set value and more than a second set value for a first predetermined time.

8. The vehicle of claim 7, wherein said controller, when said engine is automatically stopped, controls said engine to automatically start when a value of the change in pressure is less than the second set value and greater than a third set value for a second predetermined time, the second predetermined time being greater than the first predetermined time.

9. A hybrid vehicle comprising:
   an internal combustion engine having an output shaft;
   an electric motor connected to the output shaft of said engine;
   a negative pressure assist type brake apparatus;
   a power assist detector for detecting a pressure change in negative pressure of the assist type brake apparatus;
   an automatic engine stop/start-up control apparatus for automatically stopping said engine when an automatic stop condition is satisfied while said engine is driven and for automatically starting said engine when an automatic start-up condition is satisfied while said engine is automatically stopped, said automatic engine stop/start-up control apparatus including a controller for automatically starting the engine when said power assist detector detects a pressure change that exceeds a first set value while said engine is automatically stopped.

10. The hybrid vehicle of claim 9, wherein said controller, when said engine is automatically stopped, controls said engine to automatically start when said power assist detector detects a pressure change that is less than the first set value and more than a second set value for a first predetermined time.

11. The hybrid vehicle of claim 10, wherein said controller, when said engine is automatically stopped, controls said engine to automatically start when said power assist detector detects a pressure change that is less than the second set value and greater than a third set value for a second predetermined time, the second predetermined time being greater than the first predetermined time.

* * * * *